United States Patent
Kawanabe et al.

(12)

(10) Patent No.: US 9,623,820 B2
(45) Date of Patent: Apr. 18, 2017

(54) VEHICLE END SECTION STRUCTURE

(71) Applicant: TOYOTA JIDOSHA KABUSHIKI KAISHA, Toyota-shi, Aichi-ken (JP)

(72) Inventors: Sho Kawanabe, Miyoshi (JP); Tokutsugu Minami, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/777,720

(22) PCT Filed: Mar. 20, 2014

(86) PCT No.: PCT/JP2014/059061
§ 371 (c)(1),
(2) Date: Sep. 16, 2015

(87) PCT Pub. No.: WO2014/162993
PCT Pub. Date: Oct. 9, 2014

(65) Prior Publication Data
US 2016/0280165 A1  Sep. 29, 2016

(30) Foreign Application Priority Data

Apr. 5, 2013 (JP) ................................. 2013-079420

(51) Int. Cl.
*B60R 19/02* (2006.01)
*B60R 19/44* (2006.01)
*B60R 19/18* (2006.01)

(52) U.S. Cl.
CPC ........ *B60R 19/18* (2013.01); *B60R 2019/186* (2013.01); *B60R 2019/1886* (2013.01)

(58) Field of Classification Search
CPC ....... B60R 19/44; B60R 19/445; B60R 16/52; B60R 2019/186
(Continued)

(56) References Cited

U.S. PATENT DOCUMENTS 1,404,517 A * 1/1922 French ................... B60R 19/28
293/137
1,457,532 A * 6/1923 Lyon ..................... B60R 19/285
293/143

(Continued)

FOREIGN PATENT DOCUMENTS

FR       2756524 B1 * 1/1999 ............. B60R 19/18
JP     2003-252134 A    9/2003
(Continued)

*Primary Examiner* — Dennis H Pedder
(74) *Attorney, Agent, or Firm* — Oliff PLC

(57) ABSTRACT

A vehicle end section structure including: bumper reinforcement (20) that is of elongated shape, that is provided at a vehicle front-rear direction end portion, and that is disposed with length direction in a vehicle width direction; an outside strengthening member (32) that includes a load bearing face facing toward the vehicle front-rear direction outside, that is fixed to the bumper reinforcement (20), and that projects out from the bumper reinforcement (20) in the vehicle vertical direction; and an inside strengthening member (36) that is configured as a separate body to the outside strengthening member (32), that is disposed further to the vehicle front-rear direction inside than the outside strengthening member (32), that is fixed to the bumper reinforcement (20), and that is joined to the outside strengthening member (32) at a position projected out from the bumper reinforcement (20) in the vehicle vertical direction.

6 Claims, 8 Drawing Sheets

(58) Field of Classification Search
USPC .......................................... 293/102, 142–144
See application file for complete search history.

(56) References Cited

U.S. PATENT DOCUMENTS

| | | | | | |
|---|---|---|---|---|---|
| 1,516,961 | A | * | 11/1924 | French | B60R 19/44 293/143 |
| 1,723,366 | A | * | 8/1929 | Palmer | B60R 19/023 293/144 |
| 1,978,767 | A | * | 10/1934 | Serenberg | B60R 19/44 293/143 |
| 2,107,048 | A | * | 2/1938 | Sandberg | B60R 19/44 293/143 |
| 2,108,119 | A | * | 2/1938 | Gould | B60R 19/44 293/143 |
| 2,138,782 | A | * | 11/1938 | Campbell | B60R 19/44 293/143 |
| 2,169,695 | A | * | 8/1939 | Hollins | B60R 19/52 293/115 |
| 2,178,138 | A | * | 10/1939 | Cummins | B60R 19/44 293/143 |
| 2,184,631 | A | * | 12/1939 | Buchanan | B60R 19/44 293/143 |
| 2,203,942 | A | * | 6/1940 | Condon | B60R 19/44 293/143 |
| 2,525,964 | A | * | 10/1950 | Slaback | B60D 1/60 280/491.3 |
| 6,231,093 | B1 | * | 5/2001 | Storer | B60R 19/52 293/115 |

FOREIGN PATENT DOCUMENTS

| | | |
|---|---|---|
| JP | 2004-262300 A | 9/2004 |
| JP | 2007-261525 A | 10/2007 |
| JP | 2009-001199 A | 1/2009 |
| JP | 2011-148343 A | 8/2011 |
| WO | 2012/004869 A1 | 1/2012 |

* cited by examiner

VEHICLE END SECTION STRUCTURE

TECHNICAL FIELD

The present invention relates to a vehicle end section structure applied to a front-rear direction end section of a vehicle.

BACKGROUND ART

Japanese Patent Application Laid-Open (JP-A) No. 2003-252134 (Patent Document 1) describes a bumper reinforcement strengthening structure wherein a strengthening plate is fixed to bumper reinforcement. Using the strengthening plate to strengthen the bumper reinforcement in this way enables the bumper reinforcement to be strengthened without increasing the length of the vehicle in the front-rear direction.

However, the strengthening plate in Patent Document 1 is configured by an integrally formed member with a rectangular U-shaped cross-section profile. The positioning accuracy demanded in assembly of a strengthening plate with such a configuration is difficult to achieve. In particular, since the bumper reinforcement curves along the vehicle width direction, it is difficult to achieve front-rear positioning accuracy while matching the curved shape.

SUMMARY OF INVENTION

Technical Problem

In consideration of the above circumstances, an object of the present invention is to obtain a vehicle end section structure provided with a strengthening member that is easy to assemble to bumper reinforcement.

Solution to Problem

A vehicle end section structure according to a first aspect of the present invention includes: a bumper reinforcement that is of elongated shape, that is provided at a vehicle front-rear direction end portion, and that is disposed with length direction in a vehicle width direction; an outside strengthening member that includes a load bearing face facing toward the vehicle front-rear direction outer side, that is fixed to the bumper reinforcement, and that protrude from the bumper reinforcement in a vehicle vertical direction; and an inside strengthening member that is configured as a separate body to the outside strengthening member, that is disposed further toward the vehicle front-rear direction inner side than the outside strengthening member, that is fixed to the bumper reinforcement, and that is joined to the outside strengthening member at a position protruding from the bumper reinforcement in the vehicle vertical direction.

In the vehicle end section structure according to the first aspect, the outside strengthening member and inside strengthening member are fixed to the bumper reinforcement. The outside strengthening member and inside strengthening member protrude from the bumper reinforcement in the vehicle vertical direction. Due to disposing the outside strengthening member and inside strengthening member at appropriate positions, similar advantageous effects can be obtained as when the bumper reinforcement is set at an appropriate position with respect to the height of a barrier. Moreover, in the present invention, the outside strengthening member and inside strengthening member are configured as separate bodies joined together at a position protrude from the bumper reinforcement in the vehicle vertical direction. The outside strengthening member and the inside strengthening member can thereby be positioned and fixed to the bumper reinforcement separately.

A vehicle end section structure according to a second aspect of the present invention is the vehicle end section structure of the first aspect, wherein: the inside strengthening member includes a joint portion that is disposed at a far side of the inside strengthening member from the bumper reinforcement in the vehicle vertical direction and that is joined to the outside strengthening member, and an inclined portion that inclines from the joint portion toward the vehicle front-rear direction inside on progression toward the bumper reinforcement.

In the vehicle end section structure according to the second aspect, the inside strengthening member is joined to the outside strengthening member at the far side from the bumper reinforcement in the vehicle vertical direction, and the inclined portion that is inclined from the joint portion toward the vehicle front-rear direction inner side on progression toward the bumper reinforcement supports the outside strengthening member. The support rigidity can accordingly be increased due to supporting the outside strengthening member from further toward the vehicle front-rear direction inside than the joint portion.

A vehicle end section structure according to a third aspect of the present invention is the vehicle end section structure of either the first aspect or the second aspect, wherein the outside strengthening member is formed with a bead portion that forms a protrusion further toward the vehicle front-rear direction inner side than the load bearing face.

In the vehicle end section structure according to the third aspect, after a portion of a collision load has been input to the load bearing face of the outside strengthening member, this load is input to the bead portion. This enables a stroke for energy absorption of the depth (length along the vehicle front-rear direction) of the bead portion to be secured.

A vehicle end section structure according to a fourth aspect of the present invention is the vehicle end section structure of the third aspect, wherein the bead portion is formed along the vehicle vertical direction.

In the vehicle end section structure according to the fourth aspect, the bead portion extends along the vehicle vertical direction, such that a resistance moment can be obtained to with respect to a tilting moment attempting to tilt the outside strengthening member toward the vehicle front-rear direction inner side in the event of collision load input.

A vehicle end section structure according to a fifth aspect of the present invention is the vehicle end section structure of any one of the first aspect to the fourth aspect, wherein the outside strengthening member is fixed to a vehicle front-rear direction outside face of the bumper reinforcement.

In the vehicle end section structure according to the fifth aspect, the outside strengthening member is superimposed on the bumper reinforcement in a collision load input direction, such that at the fixed portion of the outside strengthening member, when collision load acts, the fixed portion of the outside strengthening member is pushed toward the bumper reinforcement. The fixed portion of the outside strengthening member can thereby be suppressed from coming away from the bumper reinforcement.

A vehicle end section structure according to a sixth aspect of the present invention is the vehicle end section structure of any one of the first aspect to the fourth aspect, further including an upright joint portion where vehicle width direction end portions of the outside strengthening member and the inside strengthening member are joined together along the vehicle vertical direction.

In the vehicle end section structure according to the sixth aspect of the present invention, the vehicle width direction end portions of the outside strengthening member and inside strengthening member are joined together. The upright joint portion that is the joint location therebetween is joined along the vehicle vertical direction. Strength and rigidity with respect to a tilt moment in the event of collision load input can accordingly be increased.

Advantageous Effects

As described above, the vehicle end section structure of the first aspect of the present invention enables easy assembly of the outside strengthening member and the inside strengthening member to the bumper reinforcement.

The vehicle end section structure of the second aspect of the present invention enables the rigidity of the strengthening member with respect to input collision load to be increased.

The vehicle end section structure of the third aspect of the present invention enables the energy absorption effect of the strengthening member to be increased.

The vehicle end section structure of the fourth aspect of the present invention enables barrier submarining in the event of collision load input to be effectively suppressed or prevented.

The vehicle end section structure of the fifth aspect of the present invention enables the strength and rigidity of the outside strengthening member with respect to collision load input to be increased.

The vehicle end section structure of the sixth aspect of the present invention enables the strength and rigidity of the strengthening member to be increased.

DESCRIPTION OF EMBODIMENTS

Figure 1:
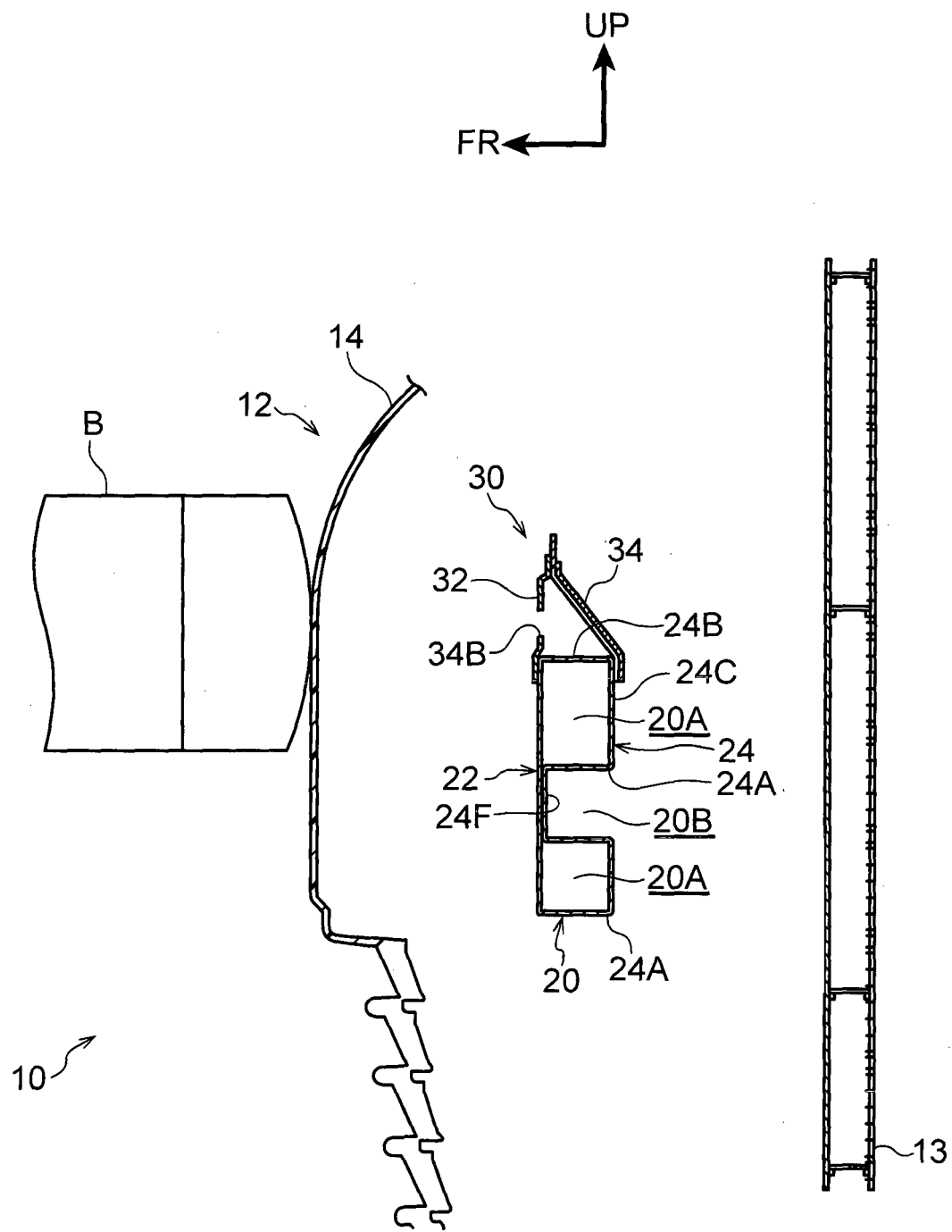
FIG. 1 is a side cross-section illustrating a vehicle end section structure according to an exemplary embodiment of the present invention.

Explanation follows regarding an exemplary embodiment of a vehicle end section structure of the present invention with reference to the drawings. Note that in the drawings, the arrow FR indicates the vehicle front side and the arrow UP indicates the vehicle upper side as appropriate.

FIG. 1 is a schematic side face view illustrating a vehicle front end lower portion 10 applied with a vehicle end section structure according to the present invention. A bumper cover 14 of a front bumper 12 is disposed running in the vehicle width direction in the vehicle front end lower portion 10 of the present exemplary embodiment. Moreover, bumper reinforcement 20 that is a framework member of the front bumper is disposed on the vehicle inside of bumper cover 14.

Figure 2:
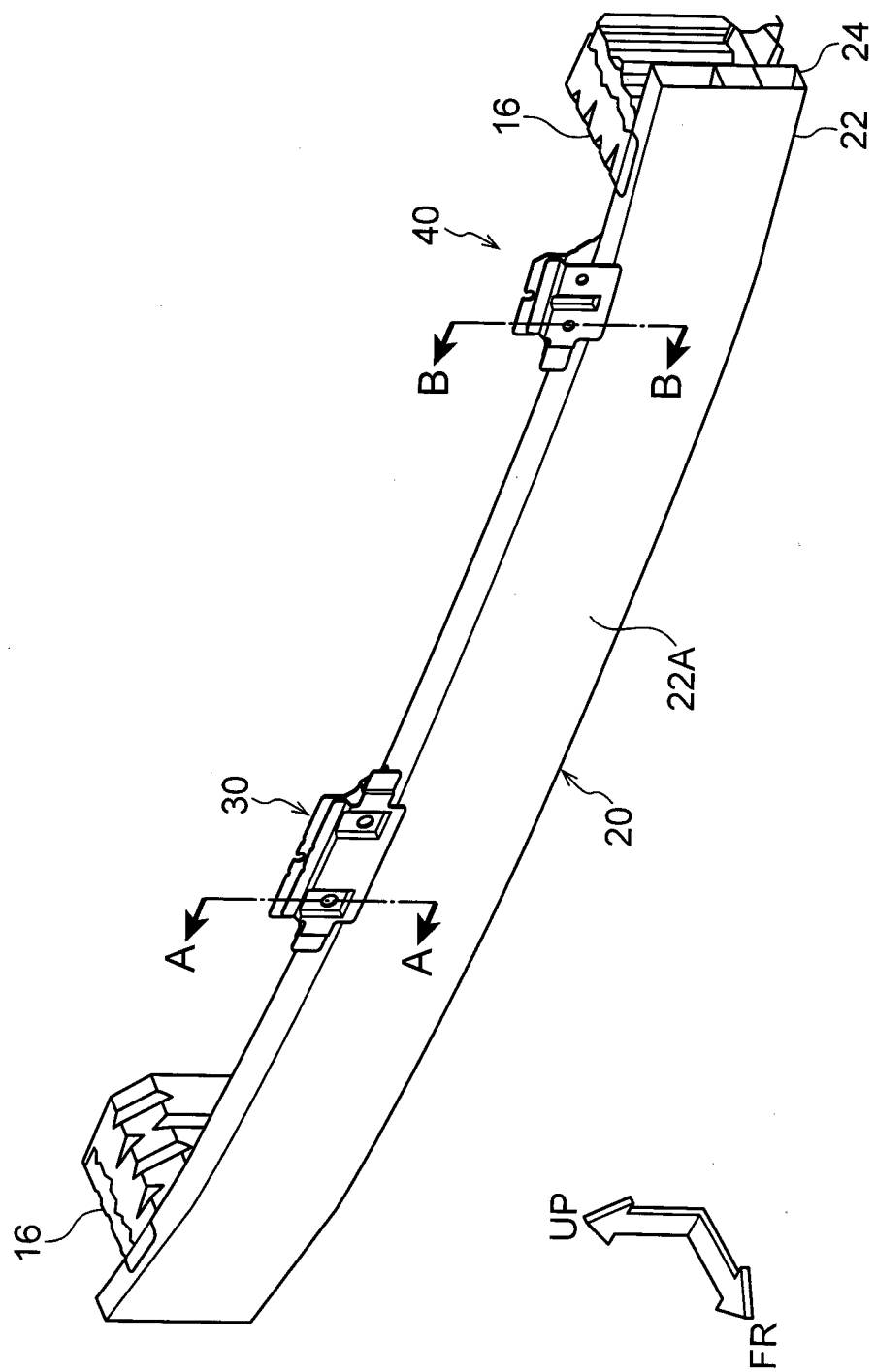
FIG. 2 is a perspective view illustrating relevant portions of a vehicle end section structure according to an exemplary embodiment of the present invention, as viewed diagonally from the front of the vehicle body.

As illustrated in FIG. 2, the bumper reinforcement 20 is disposed running in the vehicle width direction and is configured with a curved shape that is curved toward the vehicle rear at the vehicle width direction outsides of the bumper reinforcement 20. Both vehicle width direction end portions of the bumper reinforcement 20 are coupled to front side members (not illustrated in the drawings) through crash boxes 16. An air condenser 13 is disposed at the vehicle rear side of the bumper reinforcement 20.

As illustrated in FIG. 1, the bumper reinforcement 20 includes a front plate portion 22 and a rear plate portion 24. The front plate portion 22 is configured with a single plane shape, is disposed at the vehicle front side of bumper reinforcement 20, and configures a collision face 22A. The rear plate portion 24 is disposed to the vehicle rear side of the front plate portion 22 and is configured with a cross-section profile including two individual protruding portions 24A that protrude toward the vehicle rear direction. Two closed cross-sections 20A are formed between front plate portion 22 and rear plate portion 24, and a recessed portion 20B is formed between the two protruding portions 24A in the vehicle up-down direction. A wall portion 24F at a vehicle front side of the recessed portion 20B is joined to a back face side of the front plate portion 22. An upper face of the bumper reinforcement 20 is configured by an upper face 24B of the vehicle upper side protruding portion 24A of the rear plate portion 24, and a back face of the bumper reinforcement 20 is configured by a vehicle rear side back face 24C of the rear plate portion 24.

As illustrated in FIG. 2, a center strengthening member 30 is disposed at an upper portion of the bumper reinforcement 20 slightly to the right side of the bumper reinforcement 20 vehicle width direction center. Moreover, an end portion strengthening member 40 is disposed to the upper portion of the bumper reinforcement 20 slightly further toward the vehicle inside than the crash box 16 on the vehicle width direction left side end portion of the bumper reinforcement 20.

Figure 3:
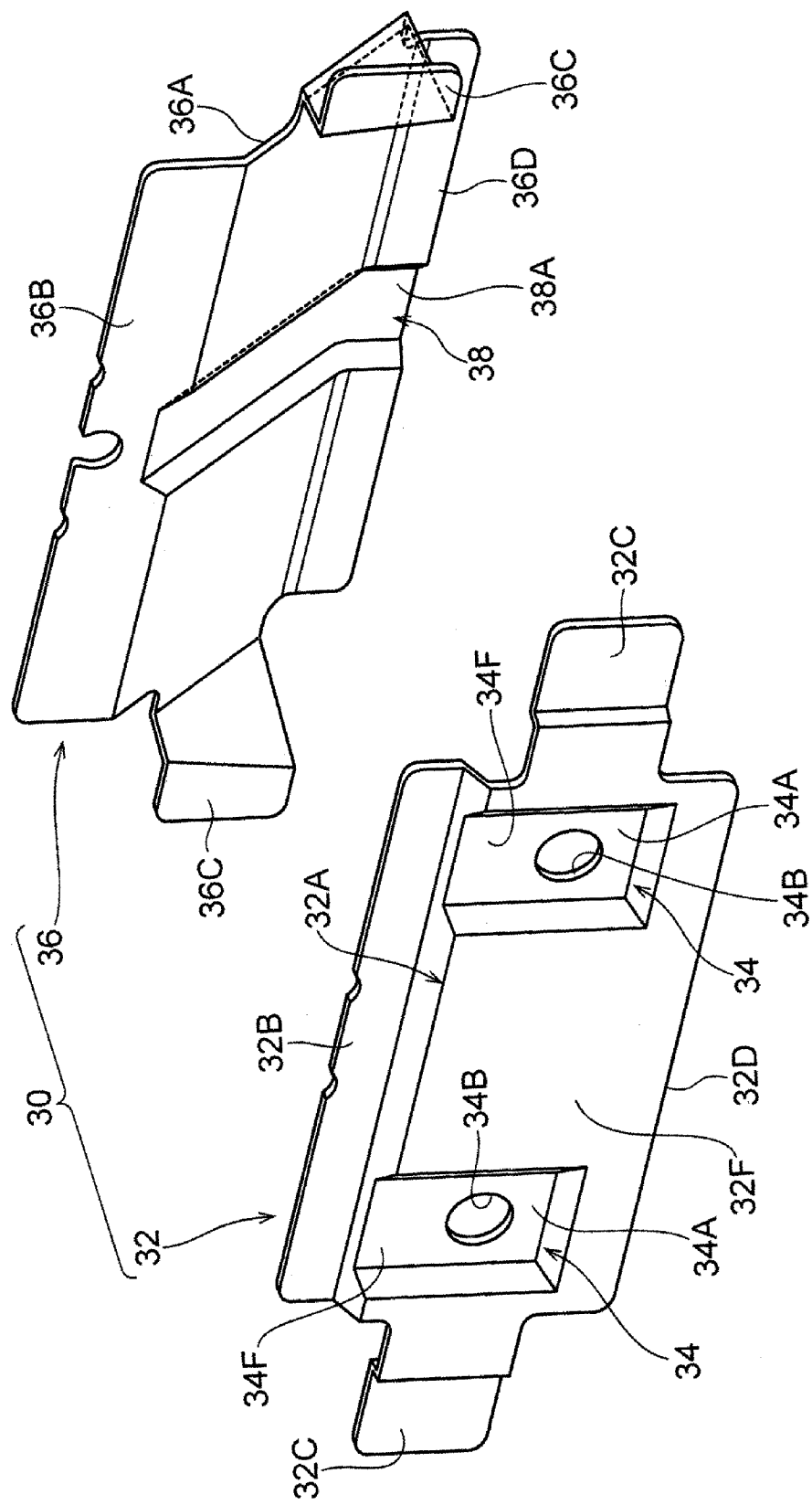
FIG. 3 is an exploded perspective view illustrating a center strengthening member according to an exemplary embodiment of the present invention.
Figure 4:
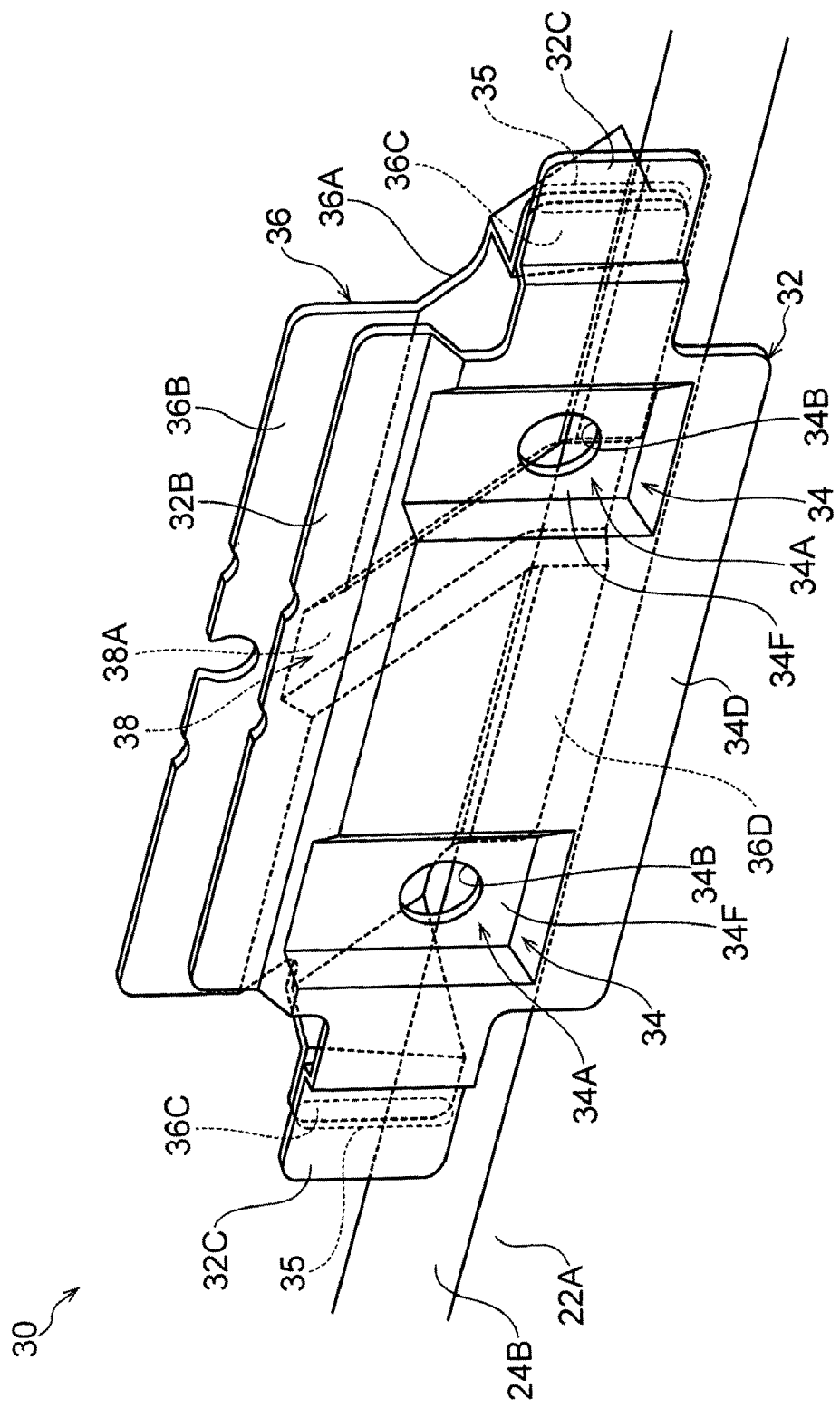
FIG. 4 is a perspective view illustrating an attached state of a center strengthening member to bumper reinforcement according to an exemplary embodiment of the present invention.

As illustrated in FIG. 3 and FIG. 4, the center strengthening member 30 includes a center front strengthening member 32 and a center rear strengthening member 36. The center front strengthening member 32 and the center rear strengthening member 36 are configured as separate members that are joined to each other during installation to the bumper reinforcement 20. The center front strengthening member 32 configures the front side of the center strengthening member 30, and the center rear strengthening member 36 configures the rear side of the center strengthening member 30.

The center front strengthening member 32 is configured in a substantially rectangular plate shape, and includes a center main body portion 32A, an upper joint portion 32B, lateral joint portions 32C and a lower joint portion 32D. A center collision face 32F serving as a collision face is formed at a front side of the center main body portion 32A. The lower joint portion 32D is formed at a lower side of the center main body portion 32A, with a front face of the lower joint portion 32D configured in the same plane as the center collision face 32F. The lower joint portion 32D is joined to an upper portion of the collision face 22A of the bumper reinforcement 20. An upper side of the center front strengthening member 32 to the lower joint portion 32D projects out further toward the vehicle upper side than the bumper reinforcement 20. The lateral joint portions 32C are formed on both vehicle width direction sides of the center main body portion 32A, with front faces of the lateral joint portions 32C disposed further to the vehicle rear side than the center collision face 32F. The upper joint portion 32B is formed at an upper side of the center main body portion 32A, with a front face of the upper joint portion 32B disposed further toward the vehicle rear side than the center collision face 32F.

Figure 5:
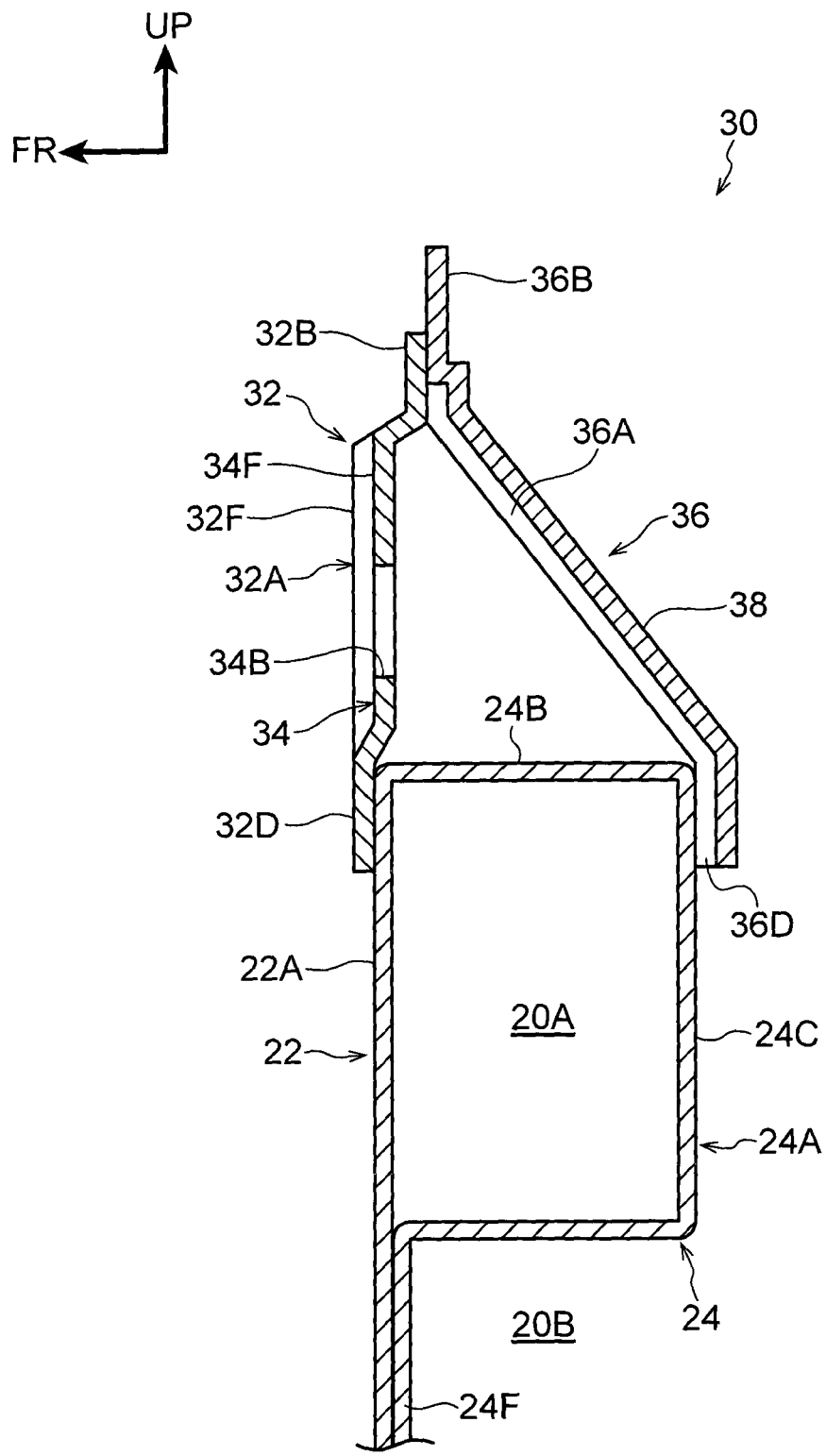
FIG. 5 is a cross-section view of a center strengthening member of an exemplary embodiment of the present invention, taken along line A-A in FIG. 2.

The center main body portion 32A is formed with two bead portions 34 side-by-side in the vehicle width direction. The bead portions 34 are formed so as to project out from the center collision face 32F toward the vehicle rear. Vehicle rear sides of the bead portions 34 are provided with bottom portions 34A that are rectangular shaped when viewed face-on, the bottom portions 34A disposed with length direction in the vehicle up-down direction. Moreover, lower ends of the bead portions 34 are disposed so as to be at substantially the same height as the upper face 24B of the bumper reinforcement 20. As illustrated in FIG. 5, vehicle front side faces 34F of the bottom portions 34A are disposed so as to be in the same position in the vehicle front-rear direction as the collision face 22A of the bumper reinforcement 20. Holes 34B are formed in the bottom portions 34A of the bead portions 34.

The center rear strengthening member 36 is configured in a substantially rectangular plate shape, and includes a center inclined portion 36A, an upper joint portion 36B, lateral joint portions 36C and a lower joint portion 36D. The upper joint portion 36B is joined to the upper joint portion 32B, with the joint location disposed above the upper face 24B of the bumper reinforcement 20. The upper joint portion 36B projects out further upwards than the upper joint portion 32B. The center inclined portion 36A extends out from a lower end of the upper joint portion 36B so as to incline toward the vehicle rear lower side. The lower joint portion 36D is bent toward the vehicle downwards direction from a lower end of the center inclined portion 36A. The lower joint portion 36D is joined to the back face 24C of the bumper reinforcement 20.

A bead portion 38 is formed at the vehicle width direction center of the center inclined portion 36A. The bead portion 38 projects out toward the vehicle rear and is formed running in the vehicle vertical direction from a lower portion of the upper joint portion 36B to a lower end of the lower joint portion 36D. A bottom portion 38A that is rectangular shaped when viewed face-on is formed at the vehicle rear side of the bead portion 38. The lateral joint portions 36C are formed projecting out toward the vehicle front side from both vehicle width direction sides of the center inclined portion 36A, with front faces of the lateral joint portions 36C joined to the lateral joint portions 32C. The joint locations between the lateral joint portions 32C and the lateral joint portions 36C configure upright joint portions 35 that run along the vehicle vertical direction. The lateral joint portions 32C project out further in the vehicle width direction than lateral joint portions 36C. The lateral joint portions 32C and lateral joint portions 36C are joined by welding along the vehicle vertical direction from the vehicle rear side.

The center main body portion 32A, the center inclined portion 36A and the upper face 24B configure a closed cross-section between the bumper reinforcement 20 and the center strengthening member 30.

Figure 6:
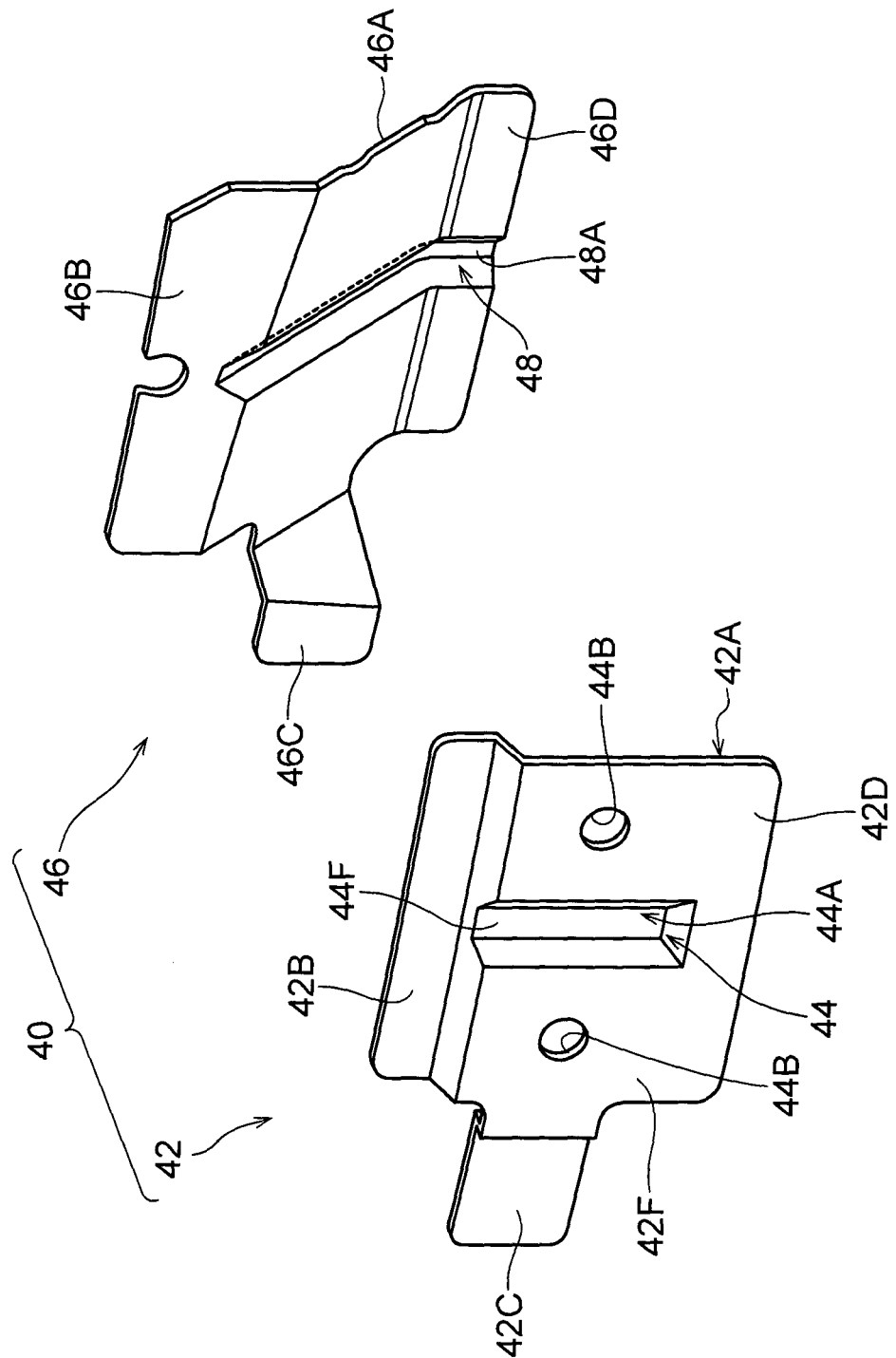
FIG. 6 is an exploded perspective view illustrating an end strengthening member according to an exemplary embodiment of the present invention.
Figure 7:
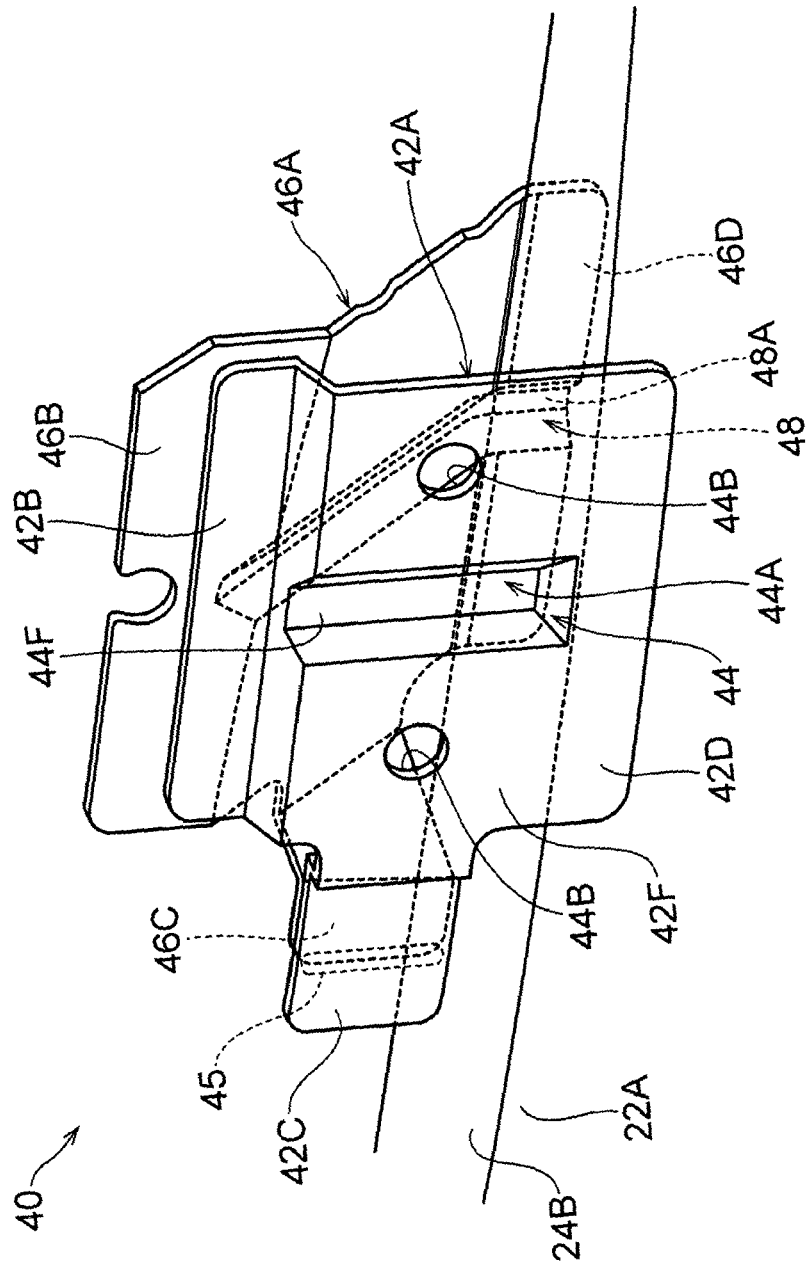
FIG. 7 is a perspective view illustrating an attached state of an end strengthening member to bumper reinforcement according to an exemplary embodiment of the present invention.
Figure 8:
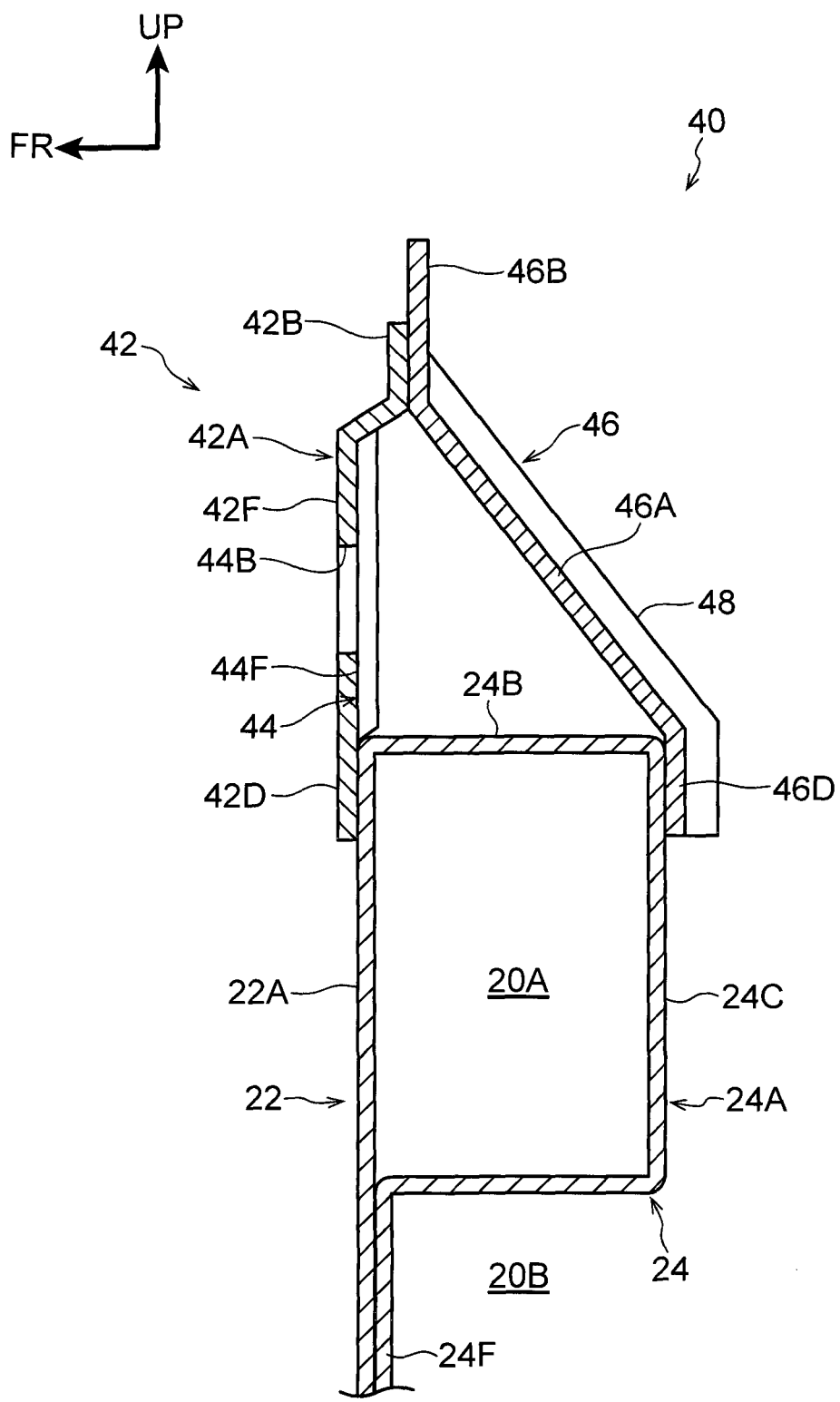
FIG. 8 is a cross-section view of an end strengthening member of an exemplary embodiment of the present invention, taken along line B-B in FIG. 2.

As illustrated in FIG. 6 to FIG. 8, the end portion strengthening member 40 includes an end front strengthening member 42 and an end rear strengthening member 46. The end front strengthening member 42 and the end rear strengthening member 46 are configured by separate members that are joined to each other during installation to the bumper reinforcement 20. The end front strengthening member 42 configures the front side of the end portion strengthening member 40, and the end rear strengthening member 46 configures the rear side of the end portion strengthening member 40.

The end front strengthening member 42 is configured in a substantially rectangular plate shape, and includes an end main body portion 42A, an upper joint portion 42B, a lateral joint portion 42C and a lower joint portion 42D. An end collision face 42F is formed at a front side of the end main body portion 42A. The end collision face 42F is formed with one hole 44B on each vehicle width direction side of a bead portion 44, described later. The lower joint portion 42D is formed at a lower side of the end main body portion 42A, with a front face of the lower joint portion 42D configured in the same plane as the end collision face 42F. The lower joint portion 42D is joined to an upper portion of the collision face 22A of the bumper reinforcement 20. Positions further to the upper side on the end front strengthening member 42 than the lower joint portion 42D project out further toward the vehicle upper side than the bumper reinforcement 20. The lateral joint portion 42C is formed at the vehicle width direction inside of the end main body portion 42A, with the front face of the lateral joint portion 42C disposed further to the vehicle rear side than the end collision face 42F. The upper joint portion 42B is formed at the upper side of the end main body portion 42A, with the front face of the upper joint portion 42B disposed further toward the vehicle rear side than end collision face 42F.

The end main body portion 42A is formed with the bead portion 44 running in the vehicle vertical direction. The bead portion 44 is formed so as to project out from the end collision face 42F toward the vehicle rear. A bottom portion 44A with a flattened profile is provided at a vehicle rear side of the bead portion 44A. Moreover, a lower end of the bead portion 44 is disposed at substantially the same height as the upper face 24B of the bumper reinforcement 20. As illustrated in FIG. 8, a vehicle front face 44F of the bottom portion 44A is disposed at the same position in the vehicle front-rear direction as the collision face 22A of the bumper reinforcement 20.

The end rear strengthening member 46 is configured in a substantially rectangular plate shape, and includes an end inclined portion 46A, an upper joint portion 46B, a lateral joint portion 46C and a lower joint portion 46D. The upper joint portion 46B is joined to the upper joint portion 42B, with the joint location disposed above the upper face 24B of the bumper reinforcement 20. The upper joint portion 46B projects upwards further than upper joint portion 42B. The end inclined portion 46A extends out from the lower end of upper joint portion 46B so as to incline toward the vehicle rear lower side. The lower joint portion 46D is bent toward the vehicle downwards direction from a lower end of the end inclined portion 46A. The lower joint portion 46D is joined to the back face 24C of the bumper reinforcement 20.

A bead portion 48 is formed at the vehicle width direction center of the end inclined portion 46A. The bead portion 48 projects out toward the vehicle rear and is formed running in the vehicle vertical direction from a lower portion of the upper joint portion 46B to a lower end of the lower joint portion 46D. A bottom portion 48A that is rectangular shaped when viewed face-on is formed at the vehicle rear side of the bead portion 48. The lateral joint portion 46C is formed projecting out toward the vehicle front side from the vehicle width direction inside of the end inclined portion 46A, with a front face of the lateral joint portion 46C joined to the lateral joint portion 42C. The lateral joint portion 42C projects out further in the vehicle width direction than the lateral joint portion 46C, and the lateral joint portion 42C and lateral joint portion 46C are joined by welding along the vehicle vertical direction from the vehicle rear side. The joint location between the lateral joint portion 42C and the lateral joint portion 46C configures an upright joint portion 45 that runs along the vehicle vertical direction.

The end main body portion 42A, the end inclined portion 46A and the upper face 24B configure a closed cross-section between the bumper reinforcement 20 and the end portion strengthening member 40.

Note that the center strengthening member 30 and the end portion strengthening member 40 may be formed from metal, from resin or from another material.

Explanation follows regarding operation of the present exemplary embodiment. In the present exemplary embodiment, the center strengthening member 30 and the end portion strengthening member 40 are disposed at an upper portion of the bumper reinforcement 20. When a barrier B collides with the front bumper 12 at a position such as that illustrated in FIG. 1, an upper portion of the barrier B comes into contact with the center strengthening member 30 and the end portion strengthening member 40. In the event of a collision, energy is absorbed due to collision load received from the barrier B being transmitted to the bumper reinforcement 20, being transmitted from the bumper reinforcement 20 to the crash boxes 16 at the vehicle width direction outsides, and by plastic deformation of the crash boxes 16 in their axial compression direction.

In the present exemplary embodiment, the bumper reinforcement 20 is provided with the center strengthening member 30 and the end portion strengthening member 40, thereby increasing a vehicle vertical direction overlap amount between the barrier B and the bumper reinforcement 20. This enables similar advantageous effects to be obtained to when the height of bumper reinforcement 20 is actually raised toward the vehicle upper side. Intrusion of the barrier B into the vehicle cabin interior can thereby be suppressed. In particular, in a vehicle that has a low vehicle height and a low bumper reinforcement 20 position, intrusion of the barrier B can be easily addressed without such design modifications as changing the position or enlarging the profile of the bumper reinforcement 20 itself. Damage to expensive components that are positioned behind the bumper reinforcement 20 such as the air condenser 13 can thereby be suppressed or prevented.

Moreover, in the present exemplary embodiment, the center strengthening member 30 and the end portion strengthening member 40 are each formed from separate members in the vehicle front-rear direction, enabling the front side members and rear side members (the center front strengthening member 32 and the center rear strengthening member 36, and the end front strengthening member 42 and the end rear strengthening member 46) to be positioned and attached separately during assembly to the bumper reinforcement 20. As a result, even on the curve shaped bumper reinforcement 20, components such as the center collision face 32F and the end collision face 42F can be easily positioned while matching the curve shape, enabling ease of assembly to be improved.

Moreover, in the present exemplary embodiment, the center rear strengthening member 36 provided with the center inclined portion 36A supports the center front strengthening member 32 from the vehicle rear side, thereby enabling the support rigidity to be increased when collision load is input from the vehicle front. Moreover, the end front strengthening member 42 is supported from the vehicle rear side due to similarly providing the end rear strengthening member 46 with the end inclined portion 46A, enabling the support rigidity to be increased when collision load is input from the vehicle front.

Moreover, in the present exemplary embodiment, the bead portions 34 formed to the center front strengthening member 32 are formed so as to project out from the center collision face 32F toward the vehicle rear. Collision load from the vehicle front is accordingly input to the bead portions 34 after being input to center collision face 32F. This enables a stroke for energy absorption of the depth of the bead portions 34 to be secured, enabling a high energy absorption function to be exhibited. Moreover, the bead portions 34 extend in the vehicle vertical direction, such that a resistance moment can be obtained to with respect to a tilt moment attempting to tilt the center front strengthening member 32 toward the vehicle front-rear direction inside in the event of collision load input.

Note that the bead portion 44 formed to the end front strengthening member 42 enables similar advantageous effects to be exhibited based on the similar configuration to the bead portions 34.

Moreover, in the present exemplary embodiment the center front strengthening member 32 and the end front strengthening member 42 are fixed to the collision face 22A of the bumper reinforcement 20, such that the center front strengthening member 32 and the end front strengthening member 42 are respectively superimposed on the bumper reinforcement 20 in the vehicle front-rear direction. The lower joint portions 32D, 42D of the center front strengthening member 32 and the end front strengthening member 42 are thereby respectively pushed toward the bumper reinforcement 20 when collision load is input from the vehicle front. The center front strengthening member 32 and the end front strengthening member 42 can thereby be suppressed from coming away from the bumper reinforcement.

Moreover, in the present exemplary embodiment, the center front strengthening member 32 and the center rear strengthening member 36 are configured with substantially the same length as each other in the vehicle width direction, and are joined together by welding along the vehicle vertical direction at the lateral joint portions 32C and the lateral joint portions 36C, respectively formed at the vehicle width direction end portions thereof. Collision load from the center front strengthening member 32 can thereby be received in a well-balanced manner by the center rear strengthening member 36. The end front strengthening member 42 and the end rear strengthening member 46 are also configured with substantially the same length as each other in the vehicle width direction, and are joined together by welding along the vehicle vertical direction at the lateral joint portion 42C and the lateral joint portion 46C respectively formed at the vehicle width direction end portions of the end front strengthening member 42 and the end rear strengthening member 46. Similar advantageous effects can thereby be exhibited to those explained above.

Moreover, the upright joint portions 35 that are the joint locations of the center front strengthening member 32 to the center rear strengthening member 36, and the upright joint portion 45 that is the joint location of the end front strengthening member 42 to the end rear strengthening member 46 run along the vehicle vertical direction. Strength with respect to a tilt moment in the event that collision load is input can accordingly be increased.

Moreover, in the present exemplary embodiment, the center strengthening member 30 and the end portion strengthening member 40 are relatively short in length in the vehicle width direction, enabling high degrees of freedom for attachment and placement at optimal positions in consideration of the left-right balance of each vehicle type. Moreover, degrees of freedom in the platform and design characteristics can be secured. Moreover, the center strengthening member 30 and the end portion strengthening member 40 need only be disposed in necessary positions, enabling any effect on other performance factors such as pedestrian protection performance and cooling performance to be lessened, as well as enabling a reduction in weight and cost.

Note that each of the vehicle width direction lengths of the center strengthening member 30 and the end portion strengthening member 40 is preferably one tenth or less of the overall vehicle width direction length of bumper reinforcement 20.

Moreover, in the present exemplary embodiment the center strengthening member 30 and the end portion strengthening member 40 are disposed at the upper side of the bumper reinforcement 20, however the center strengthening member 30 and the end portion strengthening member 40 may be disposed at the lower side of the bumper reinforcement 20.

Moreover, in the present exemplary embodiment, the center strengthening member 30 and the end portion strengthening member 40 are installed to the front bumper 12, however the center strengthening member 30 and the end portion strengthening member 40 may also be installed to a rear bumper. The center strengthening member 30 and the end portion strengthening member 40 are disposed with the vehicle front-rear directions reversed when installed to a rear bumper. Namely, the collision faces 32F, 42F are disposed facing the vehicle rear.

Moreover, in the present exemplary embodiment, one strengthening member is disposed at the center of the bumper reinforcement 20 and one strengthening member is disposed in the vicinity of the end portion of the bumper reinforcement 20, but the number of strengthening members disposed may be one, or may be three or more. For example, cases in which the vehicle center of gravity tends toward the left or right may be accommodated for example by disposing a strengthening member on one vehicle width direction side only.

The disclosure of Japanese Patent Application No. 2013-079420 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A vehicle end section structure comprising:
bumper reinforcement that is of elongated shape, that is provided at a vehicle front-rear direction end portion, and that is disposed with length direction in a vehicle width direction;
plate-shaped outside strengthening member that comprises a load bearing face facing toward the vehicle front-rear direction outside, that is fixed to the bumper reinforcement, and that projects out from the bumper reinforcement in the vehicle up-down direction; and
plate-shaped inside strengthening member that is configured as a separate body to the outside strengthening member, that is disposed further to the vehicle front-rear direction inside than the outside strengthening member, that is fixed to the bumper reinforcement, that is joined to the outside strengthening member at a position projected out from the bumper reinforcement in the vehicle up-down direction, and that forms a closed cross-section between the bumper reinforcement and the outside strengthening member,
wherein the inside strengthening member comprises a joint portion that is disposed at a far side of the inside strengthening member from the bumper reinforcement in the vehicle vertical direction and that is joined to the outside strengthening member, and an inclined portion that inclines from the joint portion toward the vehicle front-rear direction inner side on progression toward the bumper reinforcement.

2. A vehicle end section structure comprising:
bumper reinforcement that is of elongated shape, that is provided at a vehicle front-rear direction end portion, and that is disposed with length direction in a vehicle width direction;
plate-shaped outside strengthening member that comprises a load bearing face facing toward the vehicle front-rear direction outside, that is fixed to the bumper reinforcement, and that projects out from the bumper reinforcement in the vehicle up-down direction; and
plate-shaped inside strengthening member that is configured as a separate body to the outside strengthening member, that is disposed further to the vehicle front-rear direction inside than the outside strengthening member, that is fixed to the bumper reinforcement, that is joined to the outside strengthening member at a position projected out from the bumper reinforcement in the vehicle up-down direction, and that forms a closed cross-section between the bumper reinforcement and the outside strengthening member,
wherein the outside strengthening member is formed with a bead portion that forms a protrusion further toward the vehicle front-rear direction inner side than the load bearing face.

3. The vehicle end section structure of claim 2, wherein the bead portion is formed along the vehicle vertical direction.

4. The vehicle end section structure of claim 1, wherein the outside strengthening member is fixed to a vehicle front-rear direction outside face of the bumper reinforcement.

5. A vehicle end section structure comprising:
bumper reinforcement that is of elongated shape, that is provided at a vehicle front-rear direction end portion, and that is disposed with length direction in a vehicle width direction,
plate-shaped outside strengthening member that comprises a load bearing face facing toward the vehicle front-rear direction outside, that is fixed to the bumper reinforcement, and that projects out from the bumper reinforcement in the vehicle up-down direction;

plate-shaped inside strengthening member that is configured as a separate body to the outside strengthening member, that is disposed further to the vehicle front-rear direction inside than the outside strengthening member, that is fixed to the bumper reinforcement, that is joined to the outside strengthening member at a position projected out from the bumper reinforcement in the vehicle up-down direction, and that forms a closed cross-section between the bumper reinforcement and the outside strengthening member; and an upright joint portion where vehicle width direction end portions of the outside strengthening member and the inside strengthening member are joined together along the vehicle vertical direction.

6. The vehicle end section structure of claim 2, wherein the outside strengthening member is fixed to a vehicle front-rear direction outside face of the bumper reinforcement.

\* \* \* \* \*